United States Patent [19]
Mueller et al.

[11] Patent Number: 5,700,870
[45] Date of Patent: Dec. 23, 1997

[54] COATED AIRBAGS, COATING MATERIAL AND COATING PROCESS

[75] Inventors: Johann Mueller, Burghausen; Ingrid Kern, Altoetting, both of Germany

[73] Assignee: Wacker-Chemie GmbH, Munich, Germany

[21] Appl. No.: 631,690

[22] Filed: Apr. 9, 1996

[30] Foreign Application Priority Data

Aug. 1, 1995 [DE] Germany .................. 195 28 225.6

[51] Int. Cl.⁶ ................................................. C08L 83/00
[52] U.S. Cl. ................ 524/837; 427/387; 427/389.9; 428/447; 525/478; 280/728.1
[58] Field of Search ................ 524/837; 525/478; 427/387, 389.9; 428/447

[56] References Cited

U.S. PATENT DOCUMENTS

| | | |
|---|---|---|
| 4,433,007 | 2/1984 | Marwitz et al. . |
| 4,496,687 | 1/1985 | Okada et al. . |
| 5,208,097 | 5/1993 | Honma et al. . |
| 5,254,621 | 10/1993 | Inoue et al. . |

FOREIGN PATENT DOCUMENTS

| | | |
|---|---|---|
| 0058239 | 10/1984 | European Pat. Off. . |
| 0508372 | 10/1992 | European Pat. Off. . |
| 0536723 | 4/1993 | European Pat. Off. . |
| 0552983 | 7/1993 | European Pat. Off. . |
| 0553840 | 8/1993 | European Pat. Off. . |
| 0640664 | 3/1995 | European Pat. Off. . |
| 0646672 | 4/1995 | European Pat. Off. . |
| 0669419 | 8/1995 | European Pat. Off. . |
| 0681014 | 11/1995 | European Pat. Off. . |
| 2601159 | 7/1977 | Germany . |
| 1541801 | 3/1979 | United Kingdom . |

OTHER PUBLICATIONS

Encyclopedia of Polymer Science and Engineering, vol. 15, pp. 265–266, 1989.

*Primary Examiner*—Melvyn I. Marquis
*Attorney, Agent, or Firm*—Martin Connaughton

[57] ABSTRACT

Aqueous emulsions comprising
(1) an organopolysiloxane with SiC-attached vinyl groups in the terminal units,
(2) an organopolysiloxane with at least 3 Si-attached hydrogen atoms,
(3) a catalyst promoting the addition of Si-attached hydrogen to aliphatic multiple bonds,
(4) an organosilicon adhesion promoter,
(5) a silicone resin,
(6) an emulsifier and
(7) water.

8 Claims, No Drawings

COATED AIRBAGS, COATING MATERIAL AND COATING PROCESS

FIELD OF THE INVENTION

The present invention relates to aqueous emulsions, a process for preparing them, materials prepared using the aqueous emulsions, a process for coating organic fibers using such aqueous emulsions, and textile substrates coated with the emulsions.

BACKGROUND OF INVENTION

EP-A-508 372 describes a free-radically crosslinking organopolysiloxane composition without silicone resin in an organic solvent for coating airbags. U.S. Pat. No. 5,208,097 describes addition-crosslinking organopolysiloxane compositions without silicone resin in an organic solvent used for coating airbags. EP-A-536 723 describes addition-crosslinking organopolysiloxane compositions without silicone resin in an organic solvent used for coating airbags, which organopolysiloxanes must have a specific molecular weight distribution. EP-A-552 983 describes addition-crosslinking organopolysiloxane compositions without silicone resin in an organic solvent used for coating airbags. The organopolysiloxanes used are costly trivinyl-stopped organopolysiloxanes. U.S. Pat. No. 5,254,621 and U.S. Pat. No. 4,496,687 describe condensation-crosslinking organopolysiloxanes which contain no resin but contain textile-damaging tin compounds due to nonremovable tin catalysts. EP-553 840 describes a liquid silicone rubber that is completely solvent-free. Aqueous emulsions without silicone resin of addition-crosslinking organopolysiloxanes are described for coating release papers in DE-A-2601159 and for finishing textile materials in EP-B-58 239.

SUMMARY OF INVENTION

It is an object of the present invention to overcome the disadvantages of the above references and provide aqueous emulsions that have a low coating weight, improved adhesion of the coating, improved values in the ISO 5981 scrub test, and permits an inexpensive coating process.

The present invention provides aqueous emulsions comprising (1) an organopolysiloxane with SiC-attached vinyl groups in the terminal units, (2) an organopolysiloxane with at least 3 Si-attached hydrogen atoms, (3) a catalyst promoting the addition of Si-attached hydrogen to aliphatic multiple bonds, (4) an organosilicon adhesion promoter, (5) a silicone resin, (6) an emulsifier and (7) water.

Said diorganopolysiloxane (1) with SiC-attached vinyl groups in the terminal units of this invention are any desired diorganopolysiloxanes with vinyl groups attached to the terminal units, preferably those of the formula

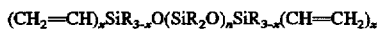

where

R is identical or different hydrocarbyl radicals with 1 to 18 carbon atoms, which may be substituted, and x is 1, 2 or 3, preferably 1, and n is a number wherein the diorganopolysiloxanes (1) have an average viscosity of 100–500,000 mPa·s at 25° C.

Preference is given to the range of 200–200,000 mPa·s at 25° C. and more preference to the range of 500–100,000 mPa·s at 25° C.

Examples of hydrocarbyl radicals R are alkyl radicals, such as methyl, ethyl, n-propyl, isopropyl, butyl, octyl, tetradecyl or octadecyl; cycloaliphatic hydrocarbyl radicals, such as cyclopentyl, cyclohexyl or methylcyclohexyl; aryl radicals, such as phenyl; alkaryl radicals, such as tolyl; aralkyl radicals, such as benzyl or phenylethyl. Examples of substituted hydrocarbyl radicals are halogenated radicals, such as 3,3,3-trifluoropropyl, 3-chloropropyl or chlorophenyl. Cyanoalkyl radicals, such as cyanoethyl, may be present.

Radicals with unsaturated aliphatic groups, such as vinyl, allyl, hexenyl or cyclohexenyl, may be present.

R is a hydrocarbyl having 1–10 carbon atoms, and preferably at least 80% of the organic radicals R are each methyl.

The organopolysiloxane can be identical interpolymers or mixtures of different inter-polymers with identical or different degrees of polymerization. If the diorganopolysiloxanes contain different diorganopolysiloxane units, the distribution may be random or block.

The following weight percents are based on the total weight of the emulsion. In the product of this invention, said diorganopolysiloxane (1) is present in amounts of 10–80% by weight, preferably in amounts of 20% to 60% by weight, more preferably in amounts of 20% to 50% by weight.

Said organopolysiloxane (2) with at least 3-Si-attached hydrogen atoms is of the formula

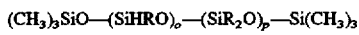

where

R is as defined above and o/p is in a range of from 1:0 to 1:20, preferably from 1:0 to 1:7.

The sum of o and p can be between 10–1000, preferably 20–200, more preferably 30–100.

Identical or different molecules of said organopolysiloxane (2) can be used.

In the organopolysiloxane with at least 3 Si-attached hydrogen atoms per molecule, the silicon valencies not saturated with hydrogen and siloxane oxygen atoms are preferably saturated with methyl, ethyl or phenyl radicals. However, all radicals described above as R can be present.

In the product of this invention, organopolysiloxane (2) is present in amounts of 1% to 40% by weight, preferably in amounts of 2% to 20% by weight, more preferably in amounts of 3% to 15% by weight.

Catalysts (3) promoting the addition of Si-attached hydrogen to aliphatic multiple bonds can be any desired catalysts which are known to promote this reaction.

Examples of such catalysts are preferably metallic, finely divided platinum (platinum sol), ruthenium, rhodium, palladium or iridium. These metals may also be applied to solid supports, such as silica, alumina or activated carbon, ceramic materials or mixed oxides or mixed hydroxides. Compounds or complexes of metals such as $PtCl_4$, $H_2PtCl_6 \cdot 6H_2O$; $Na_2PtCl_4 \cdot 4H_2O$ platinum-olefin complexes, platinum-alcohol complexes, such as Speyer's catalyst, platinum-alcoholate complexes, platinum-ether complexes, platinum-aldehyde complexes, platinum-ketone complexes, such as the reaction products of cyclohexanone and hexachloroplatinic acid, platinum-vinylsiloxane complexes, in particular platinum-divinyltetramethylsiloxane complexes with or without organically bound halogen, bis(gamma-picoline)-platinum dichloride, trimethylenepyridineplatinum dichloride, dicyclopentadieneplatinum dichloride, dimethylsulfoxydiethyleneplatinum (2) dichloride, and also the reaction products of platinum tetrachloride, dissolved in 1-octene, with sec-butylamine. Platinum compounds are preferred for use as catalysts in the product of this invention.

It is possible to use catalyst mixtures, or only one of the above mentioned catalysts.

In the present invention, the amounts of platinum catalyst used is generally between 3 and 500 ppm, based on the siloxane content. Preference is given to using a platinum content of 10-200 ppm, based on the polysiloxanes used.

Aqueous emulsions can be prepared using any desired adhesion promoters.

Examples of organosilicon compound (4) useful as adhesion promoters are silanes with hydrolyzable radicals and vinyl, acryloyloxy, methacryloyloxy, epoxy or acid anhydride groups attached to silicon via carbon. It is also possible to use partial hydrolyzates and/or mixed hydrolyzates of such silanes. Preference is given to using a reaction product of vinyltriacetoxysilane and the silane of the formula

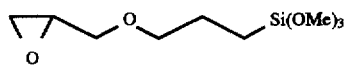

It is possible to use one type of adhesion promoter, or mixtures of two or more silanes or their reaction products or partial or mixed hydrolyzates. This adhesion promoter is used in amounts of 1% to 20% by weight, preferably in amounts of 1% to 10% by weight, more preferably in amounts of 2% to 8% by weight.

The products of this invention include a silicone resin (5) of the formula $(R_3SiO_{1/2})_a(RSiO_{3/2})_b$, so-called MT resins and/or MQ resins of the formula $(R_3SiO_{1/2})_a(SiO_{4/2})_b$, where R is as defined above and is methyl, phenyl, vinyl or hydrogen. The silane resin (5) may be in the form of an aqueous emulsion.

The ratio of a to b is chosen so that the silicone resins are within the viscosity range of 30-300,000 mPa·s. at 25° C. Preference is given to using silicone resins within the viscosity range of 50-30,000 mPa·s at 25° C., more preferably within the viscosity range from 50 to 10,000 mPa·s at 25° C.

The organosilicon compounds used in this invention are commercially available products or preparable by processes customary in silicone chemistry.

The organosilicon compounds of components (1), (2), (4) or (5) may each be individual organosilicon compounds or a mixture of different organosilicon compounds.

Aqueous emulsions containing the above mentioned ingredients may be prepared using any desired emulsifiers (6) which are used for preparing organopolysiloxane emulsions. Preference is given to nonionic emulsifiers.

Suitable emulsifiers are ionic and nonionic emulsifiers. Examples are sulfonic acid and its salts which can act as emulsifier and also alkylsulfonates, such as sodium laurylsulfonate, benzenesulfonates substituted by aliphatic hydrocarbyl radicals, such as sodium dodecylbenzenesulfonate, naphthalenesulfonates substituted by aliphatic hydrocarbyl radicals, polyethylene glycol sulfonate and lauryl phosphate, polyethylene oxide, polypropylene oxide, interpolymers of ethylene oxide and propylene oxide, stearates and phosphates.

In addition to the above-mentioned ingredients, the emulsions of the present invention may include further ingredients, such as fillers, for example alumina, aluminum hydroxide, pigments and stabilizers.

The present invention further provides a process for preparing the aqueous emulsions, which comprises emulsifying ingredients (1) to (7).

In the process of this invention, the ingredients:

(1) an organopolysiloxane with SiC-attached vinyl groups in the terminal units, (2) an organopolysiloxane with at least 3 Si-attached hydrogen atoms, (3) a catalyst promoting the addition of Si-attached hydrogen to aliphatic multiple bonds, (4) an organosilicon adhesion promoter, (5) a silicone resin, (6) an emulsifier and (7) water are mutually emulsified at room temperature (25° C.) and atmospheric pressure.

The process can also be carried out at reduced or elevated pressure and at an elevated temperature of up to 70° C., although room temperature is preferred for economic reasons.

The present invention further provides a process for coating textile substrates, which comprises applying aqueous emulsions to an undried textile and in one step vulcanizing the emulsions on textile substrates and drying the coated textile.

In the process of this invention, the aqueous emulsions can be applied to wet textiles coming directly from a washing or cleaning process. The vulcanization of the silicone coating and the drying and shrinking of the textiles can be carried out in one operation.

The present invention further provides a vulcanizate using an aqueous emulsion which is heated.

To avoid premature crosslinking, the emulsions of the invention are stored in at least two different components. One component comprises the siloxanes with the unsaturated aliphatic groups, another component comprises the siloxanes with Si-attached hydrogen. The corresponding auxiliary and additive substances may be present in either one or both of the components.

The application of the products of the invention can be carried out in a conventional manner. Examples are dipping and pad-mangling, brushing, casting, spraying, rolling, printing, knife-coating, using a Meyer rod or an air brush or by lick-rolling and screen printing.

The application of the coating material takes place during the washing process or immediately thereafter.

The vulcanization takes place in one operation at the same time as the drying and shrinking process.

In the case of wovens which have to be washed and dried, which is true of man-made fiber wovens in particular, the composition of the invention can be applied directly to the fabric immediately following washing while it is still wet. The vulcanization takes place at the same time as the drying process. This is particularly desirable and advantageous in the case of wovens used for manufacturing airbags.

Application by the above mentioned methods is followed by drying and vulcanization of the coated fabric, in a heat duct which can be heated by hot air, infrared light, gas burners, heat exchangers or other energy sources. To avoid blistering, the fabric is predried in a first zone at temperatures of 60° to 150° C., preferably 80°-130° C., more preferably 90°-120° C., and crosslinked in a second zone at temperatures of up to 300° C. Because of the limited heat resistance of most man-made fibers, the temperature range of 120°-190° C. is preferred. The residence time required for vulcanization depends on the coating weight, the thermal conductivity of the fabric and the heat transfer to the coated textile, and can vary between 0.5 and 30 minutes. Apart from most customary heat ducts, the drying and vulcanization can also be carried out by means of other technical drying equipments, such as hot roll calenders, heatable laminating presses, heatable plate presses or hot contact rolls and also by means of festoon dryers. The textiles coated according to this invention can also be dried and vulcanized using microwaves.

The products of the present invention can be used for coating or finishing textile materials of any kind. Wovens of all weave constructions, nonwovens, loop-drawn knits, lays, loop-formed knits from all customary yarns and fibers, natural fibers such as cotton, glass, wool, silk, man-made fibers, such as polyamides, polyester viscose, polyethylene, polypropylene, polyurethane, silk, viscose, cellulose can be coated. The applications for the textiles thus finished are numerous. Examples are sportswear, sports articles, such as sails, boat covers or materials for rucksacks and tents and protective clothing. Industrial applications, such as tarpaulins, conveyor belts, compensators, foldable containers.

Polyamide or polyester fabrics finished with the products of this invention by the process of this invention can be used with particular advantage for manufacturing airbags for motor vehicles.

Industrial fabrics usually need to be washed, dried and shrunk. This is true in the use for manufacturing airbags. All prior art coating processes require a separate coating step after the washing and drying. In the process of the present invention, the coating material can be applied directly in or after the washing process and vulcanized during the drying process. There is no need for an additional coating process. This represents a significant saving of energy, time and costs.

Airbags are frequently manufactured using coated wovens. Wovens coated according to the present invention provide technical advantages. The coating offers protection against the hot gases of the propellant charge. Yarn-to-yarn friction, which leads to reduction in the tensile strength and is created by vibrations, can be prevented by the present elastomer coating. The coating according to the present invention confers a better aging resistance to the fabric. An advantage of the coating process of this invention is that the costs of an additional coating step are saved.

According to the invention, there is provided an aqueous silicone system which is applied to the fabric directly after washing while it is still wet and can be vulcanized during the drying step. This coating system is an aqueous silicone coating system which, after vulcanization, has exactly the right property profile for an airbag.

EXAMPLE 1

4000 g of an aqueous emulsion containing 800 g of a dimethylpolysiloxane having vinyldimethylsiloxy units as terminal units and a viscosity of 1000 mPa·s, 800 g of a dimethylpolysiloxane having vinyldimethylsiloxy units as terminal units and a viscosity of 20,000 mPa·s, 20 g of a platinum-divinyltetramethyldisiloxane complex containing 1% by weight of platinum, 10 g of ethynylcyclohexanol, 90 g of a trimethylsiloxycapped diorganopolysiloxane with 50 mole % of methylhydrosiloxane units and 50 mole % of dimethylsiloxane units and a viscosity of 120 mPa·s and also 150 g of an organosilicon adhesion promoter prepared by reaction of 100 g of vinyltriacetoxysilane with 130 g of the silane of the formula

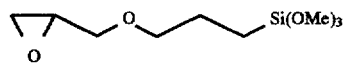

were prepared by stirring at room temperature (25° C.) and atmospheric pressure.

300 g of an aqueous emulsion of a silicone resin of the formula $(Me_3SiO_{1/2})_a (MeSiO_{3/2})_b$ with a viscosity of 2000 mPa·s, are introduced into a dip trough at room temperature (25° C.) and atmospheric pressure. A lick-roller is used to transfer this emulsion to a wet 235 dtex polyamide fabric. The coated fabric passes through a heat duct with an air temperature of 100° C. in the first zone and an air temperature of 180° C. in a second zone. The residence time in this heat duct is 3 minutes.

The fabric obtained has a silicone coating of 34 g/m. The fabric has the following properties:
DIN 53530 air permeability: 1.18 l/dm/min
DIN 53530 coating adhesion: 85 N/5 cm
ISO 5981 scrub test not less than 500

EXAMPLE 2

Example 1 is repeated without a silicone resin component. The fabric obtained has the following properties:
Coating weight: 29 g/m
DIN 53887 air permeability: 1.68 l/dm/min
DIN 53530 coating adhesion: 76 N/5 cm
ISO 5981 scrub test not less than 200

EXAMPLE 3

Example 1 is repeated with the difference that the formulation described in Example 1 was mixed with 4000 g of water. The fabric obtained had the following properties:
Coating weight: 17 g/m
DIN 53887 air permeability: 19.1 l/dm/min
DIN 53530 coating adhesion: 150 N/5 cm
ISO 5981 scrub test not less than 400

EXAMPLE 4

Example 1 was repeated without the adhesion promoter described in Example 1. The fabric obtained had the following properties:
Coating weight: 32 g/m
DIN 53887 air permeability: 1.44 l/dm/min
DIN 53530 coating adhesion: 26 N/5 cm
ISO 5981 scrub test not less than 180

EXAMPLE 5

The formulation used and described in Example 1 was knife-coated onto a polyester fabric. The coating obtained had the following properties:
Coating weight: 82 g/m
DIN 53887 air permeability: 0.28 l/dm/min
DIN 53530 coating adhesion: 105 N/5 cm
ISO 5981 scrub test not less than 360

Surface tackiness of coated fabrics:

The coated fabrics of Examples 1–5 were placed face-to-face in a heating oven and stored for 4 weeks at 150° C. under a pressure of 500 kp/m. After storage, the surfaces were not stuck or welded together.

What is claimed is:
1. An aqueous emulsion consisting essentially of
  (1) an organopolysiloxane with SiC-attached vinyl groups in the terminal units, of the formula

$$CH_2=CH)_xSiR_{3-x}O(SiR_2O)_nSiR_{3-x}(CH=CH_2)_x$$

where
R is an identical or different optionally substituted hydrocarbyl radical,
x is 1, 2 or 3, and
n is a number such that said diorganopolysiloxanes (1) have an average viscosity of 100–500,000 mPa·s at 25° C.

(2) an organopolysiloxane with at least 3 Si-attached hydrogen atoms, of the formula

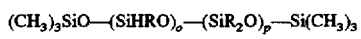

where
R is an identical or different optionally substituted hydrocarbyl radical
o/p is within the range from 1:0 to 1:20, (3) a catalyst promoting the addition of Si-attached hydrogen to aliphatic multiple bonds,
(4) an organosilicon adhesion promoter,
(5) a silicone resin,
(6) an emulsifier and
(7) water.

2. The aqueous emulsion of claim 1 wherein said silicone resins (5) are silicone resins of the formula $(R_3SiO_{1/2})_a$ $(RSiO_{3/2})_b$, so called MT resins and/or MQ resins of the general formula $(R_3SiO_{1/2})_a(SiO_{4/2})_b$, where R is an identical or different optionally substituted hydrocarbyl radical, and the ratio of a to b is such that the silicone resins are within the viscosity range of 30–300,000 mPa·s 25° C.

3. A process for preparing aqueous emulsions as claimed in claim 1, which comprises emulsifying components 1–7.

4. A vulcanizate prepared by heating the aqueous emulsion as claimed in claim 1.

5. A vulcanizate as claimed in claim 4, wherein vulcanization is carried out at elevated temperatures up to 300° C.

6. A process for coating a textile substrate, which comprises applying aqueous emulsions as claimed in claim 1 to an undried textile substrate and in one step vulcanizing the emulsions on said textile substrates and drying the coated textile.

7. A coated textile substrate comprising a textile substrate coated with an emulsion as claimed in claim 1.

8. A textile substrate coated with the aqueous emulsion as claimed in claim 1, wherein the textile substrate comprises an airbag material.

* * * * *